United States Patent [19]

Imamura et al.

[11] Patent Number: 5,927,893
[45] Date of Patent: Jul. 27, 1999

[54] JOINT MEMBER IN WELDED STRUCTURE

[75] Inventors: Yoshihaya Imamura; Kazuo Yonezawa, both of Fujisawa; Takato Fujii, Shimonoseki; Tohru Hashimura, Kobe, all of Japan

[73] Assignee: Kabushiki Kaisha Kobe Seiko Sho, Kobe, Japan

[21] Appl. No.: 08/924,321

[22] Filed: Sep. 5, 1997

[30] Foreign Application Priority Data

| Sep. 6, 1996 | [JP] | Japan | .................................... | 8-236980 |
| Sep. 6, 1996 | [JP] | Japan | .................................... | 8-236988 |

[51] Int. Cl.⁶ ..................................................... F16B 7/00
[52] U.S. Cl. .......................... 403/270; 403/205; 403/403; 29/525.14; 296/205; 296/30
[58] Field of Search ..................................... 403/205, 401, 403/402, 403, 231, 270, 271, 272, 265; 228/138, 139, 189, 171; 29/525.01, 525.14, 525.08; 296/204, 205, 29, 30, 203.01

[56] References Cited

U.S. PATENT DOCUMENTS

| 2,141,107 | 12/1938 | Greulich | ................................ | 403/272 X |
| 2,146,333 | 2/1939 | Deming | ................................ | 403/271 X |
| 2,388,297 | 11/1945 | Slaughter | ................................ | 296/29 X |
| 4,380,110 | 4/1983 | Harig | ................................ | 403/401 X |
| 4,462,629 | 7/1984 | Todori et al. | ................................ | 296/30 |
| 4,712,942 | 12/1987 | Brown | ................................ | 403/231 X |
| 4,735,355 | 4/1988 | Browning . | | |
| 4,988,230 | 1/1991 | Banthia et al. | ................................ | 403/205 X |
| 5,287,813 | 2/1994 | Hanni et al. | ................................ | 296/203.01 X |
| 5,419,064 | 5/1995 | Bennett | ................................ | 403/401 X |
| 5,498,099 | 3/1996 | Scheuer | ................................ | 403/403 |
| 5,549,352 | 8/1996 | Janotik et al. | ................................ | 296/203.01 X |
| 5,685,662 | 11/1997 | Rollin et al. | ................................ | 403/231 |
| 5,767,476 | 6/1998 | Imamura | ................................ | 219/117.1 |

FOREIGN PATENT DOCUMENTS

| 6-504013 | 5/1994 | Japan . |
| 7-167124 | 7/1995 | Japan . |
| 7-310156 | 11/1995 | Japan . |

Primary Examiner—Harry C. Kim
Attorney, Agent, or Firm—Oblon, Spivak, McClelland, Maier & Neustadt, P.C.

[57] ABSTRACT

A joint member is used for positioning a first square tubular section made of aluminum or aluminum alloy and a second square tubular section made of aluminum or aluminum alloy with the sections' end portions butting against each other so as to weld the butt end portions together. The joint member includes an angle retainment portion and first and second anchorage portions. The angle retainment portion is applied onto the outer or inner surfaces of walls of the first and second square tubular sections, the walls intersecting each other with an angle equal to or smaller than 180° when the first and second tubular sections are caused to butt against each other. The first and second anchorage portions branch off and extend from the angle retainment portion so as to fixedly hold the walls of the first and second square tubular sections, respectively, in cooperation with the angle retainment portion. The joint member facilitates and speeds the setting of the square tubular sections and thus improves setting workability while maintaining an advantage of a manufacturing method for a welded structure in which sections are directly welded without using connection members.

6 Claims, 8 Drawing Sheets

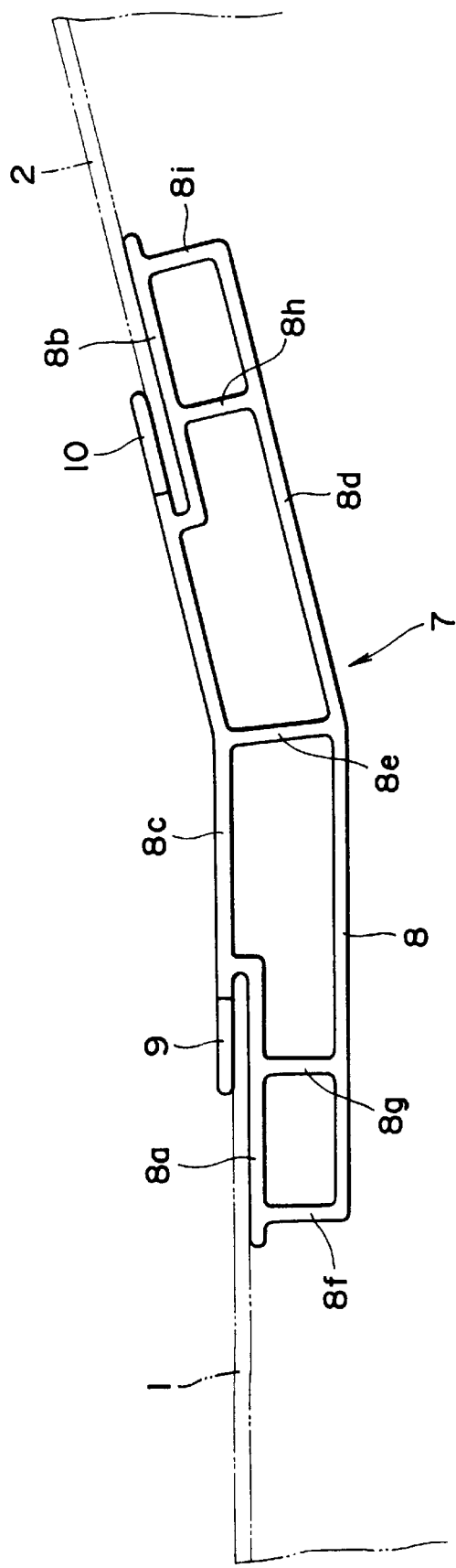

JOINT MEMBER IN WELDED STRUCTURE

BACKGROUND OF THE INVENTION

1. Field of the Invention

The present invention relates to a joint member used in welding square tubular materials made of aluminum or aluminum alloy (hereinafter generically referred to as aluminum material) to form a welded structure serving as a body frame or the like for an automobile such as a truck.

2. Description of the Related Art

According to a conventional method of forming body frames for automobiles, such as trucks, or transport planes, formed steel plates are homed at their end portions, and the homed portions are joined by resistance spot welding for reinforcement. The thus-assembled monocoque structure is used as a typical body frame for an automobile such as a truck.

This method has an advantage that assembly work can be readily automated, but has disadvantages that an assembled structure has many overlapping portions and wasteful portions and is rather bulky, and that formed members have complicated shapes with a resultant increase in weight.

By contrast, if formed members are butt-welded by arc welding or beam welding, an assembled structure will not become bulky. However, weld quality depends significantly on the butt accuracy between members to be welded. For example, if any gap is formed between members to be welded, weld quality is impaired significantly. Accordingly, jigs must be prepared to maintain members in an assembled position. Also, members themselves must be machined to high accuracy. Thus, assembly work is difficult to automate.

Recently, in order to reduce the weight of a car body, an attempt has been made to manufacture a car body from aluminum alloy. Since aluminum material is low in weldability, welding must be performed at thousands of points to assembly a monocoque structure. Therefore, consumption of electrodes is large. Also, aluminum material has a problem that formability is poorer than that of steel.

Thus, there is proposed a space frame structure in which a body frame of an automobile such as a truck, a transport plane, or the like is supported by a hollow pipe frame. FIG. 13 is a schematic view showing a space frame structure proposed for application to a typical truck. As shown in FIG. 13, square tubular aluminum sections 51 are assembled into the shape of a truck cab and welded, so that square tubular aluminum sections 51 are mutually fixed. Thus a so-called space frame structure 50 is formed. The space frame structure 50 is covered with sheet metal to complete a body of the truck.

In connection with this method of assembling square tubular aluminum sections into a body frame of an automobile, there has been proposed a method of joining sections via a connection member manufactured through casting or forging (Japanese Patent Application Laid-Open (kokai) No. 60-135375).

In a frame assembly of various kinds of structures utilizing tubular materials, when each joined portion of the assembled frame requires a strength greater than that of the frame, the joined portion is usually reinforced in the following fashion: a reinforcement plate, which is shaped and sized so as to fit a connection angle at the joined portion and to meet a required strength criterion, is applied onto the outer surface of the frame at the joined portion and is then welded to the frame.

However, this conventional method using connection members has a drawback that cost of manufacture is increased due to the complicated shape of connection members and an increased number of component members.

In this connection, the applicant of the present invention has proposed a method of manufacturing a welded structure through direct welding between sections without using connection members (Japanese Patent Application No. 8-143152, not laid open). In this earlier technology, in order to obtain good weld when sections are directly welded, end portions of sections to be welded are cut obliquely and butted against each other such that a weld bead bisects a connection angle (an angle formed by sections to be welded).

However, the work for obliquely cutting and welding the end portions of sections involves the following problems. In a process of assembling a frame wherein sections are butted against each other with a predetermined angle formed therebetween and fixed temporarily by clamping or welding, sections are unlikely to be held with a predetermined connection angle formed therebetween, and butt end portions are likely to be dislocated. As a result, setting and welding become troublesome and take time.

Also, when a joined portion is to be reinforced, after assembling a frame by welding, reinforcement plates are welded to the frame, i.e. two welding steps are involved, welding for assembly and welding of reinforcement plates. Thus, welding is rather complicated. Also, if a weld bead is present on the frame surface where a reinforcement plate is to be welded, the reinforcement of weld must be ground off, involving an additional step and additional labor.

Further, the shape and size of reinforcement plates must be designed from one reinforcement plate to the other so as to establish required characteristics for each joined portion to be reinforced. This increases design cost and requires reinforcement plates to be cut and pressed one by one according to their individual design, resulting in increased cost of manufacture.

SUMMARY OF THE INVENTION

In view of the above problems, a first object of the present invention is to provide a joint member for a welded structure which facilitates and speeds the setting of square tubular sections and thus improves setting workability while maintaining an advantage of a manufacturing method for a welded structure in which sections are directly welded without using connection members.

A second object of the present invention is to provide a joint member for a welded structure which facilitates reinforcement and does not require a special step for reinforcement.

According to a first aspect of the present invention, there is provided a joint member for a welded structure used for positioning a first square tubular section made of aluminum or aluminum alloy and a second square tubular section made of aluminum or aluminum alloy with the sections' end portions butting against each other so as to weld the butt end portions together in a process of manufacturing the welded structure, comprising an angle retainment portion and first and second anchorage portions. The angle retainment portion is applied onto the outer or inner surfaces of walls of the first and second square tubular sections, the walls intersecting each other with an angle equal to or smaller than 180° when the first and second tubular sections are caused to butt against each other. The first and second anchorage portions branch off and extend from the angle retainment portion so as to fixedly hold the walls of the first and second square tubular sections, respectively, in cooperation with the angle retainment portion.

Preferably, the joint member according to the first aspect comprises a plurality of connection ribs fixed to the back surface of the angle retainment portion and an exterior plate for connecting the connection ribs together.

According to a second aspect of the present invention, there is provided a joint member for a welded structure used for positioning a first square tubular section made of aluminum or aluminum alloy and a second square tubular section made of aluminum or aluminum alloy with the sections' end portions butting against each other so as to weld the butt end portions together in a process of manufacturing the welded structure, comprising an angle retainment portion, first and second anchorage portions, and a connection rib. The angle retainment portion is applied onto the inner surfaces of walls of the first and second square tubular sections, the walls intersecting each other with an angle equal to or smaller than 180° when the first and second tubular sections are caused to butt against each other. The first and second anchorage portions branch off and extend from the angle retainment portion so as to fixedly hold the walls of the first and second square tubular sections, respectively, in cooperation with the angle retainment portion. The connection rib connects the end portions of the first and second anchorage portions.

According to a third aspect of the present invention, there is provided a joint member for a welded structure used for positioning a first square tubular section made of aluminum or aluminum alloy and a second square tubular section made of aluminum or aluminum alloy with the sections' end portions butting against each other so as to weld the butt end portions together in a process of manufacturing the welded structure, comprising an angle retainment portion, first and second anchorage portions, and a connection rib. The angle retainment portion is applied onto the outer surfaces of walls of the first and second square tubular sections, the walls intersecting each other with an angle equal to or smaller than 180° when the first and second tubular sections are caused to butt against each other. The first and second anchorage portions branch off and extend from the angle retainment portion so as to fixedly hold the walls of the first and second square tubular sections, respectively, in cooperation with the angle retainment portion. The connection rib connects the end portions of the angle retainment portion.

Preferably, in the joint members according to the second and third aspects, a second connection rib is provided between the connection rib and the angle retainment portion.

According to the present invention, when the first and second square tubular sections are butted against each other with their walls inserted between the angle retainment portion and the first and second anchorage portions, the first and second square tubular sections are arranged with an angle (connection angle) formed therebetween which is determined by the angle retainment portion. Thus, setting is completed by merely inserting walls of the first and second square tubular sections between the angle retainment portion and the anchorage portions and is thus quite easy to perform. Also, when the first and second square tubular sections are welded together, the joint member of the present invention holds them in position, thereby preventing deformation which would otherwise occur due to welding heat.

According to the present invention, in the case where the angle retainment portion is applied onto the inner surface of an interior-angle-side wall of a section, there is provided a connection rib which connects the end portions of the first and second anchorage portions. By contrast, in the case where the angle retainment portion is applied onto the outer surface of an interior-angle-side wall of a section, there is provided a connection rib which connects the end portions of the angle retainment portion. Thus, these connection ribs serve as reinforcement elements for a joint member. The largeness, thickness, and the like of these connection ribs are determined according to required characteristics, so that the required characteristics can be readily provided.

BRIEF DESCRIPTION OF THE DRAWINGS

FIG. 2 is a sectional view showing a second embodiment of the present invention;

DESCRIPTION OF THE PREFERRED EMBODIMENTS

Figure 1A:
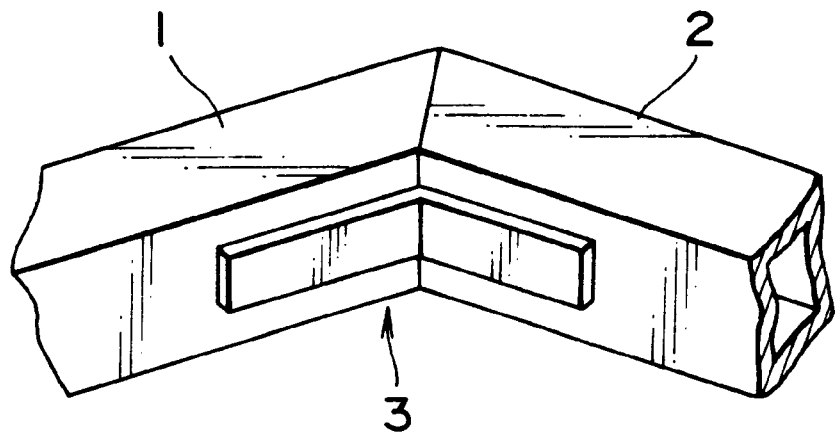
FIGS. 1a and 1b are perspective and sectional views showing a first embodiment of the present invention.
Figure 1B:
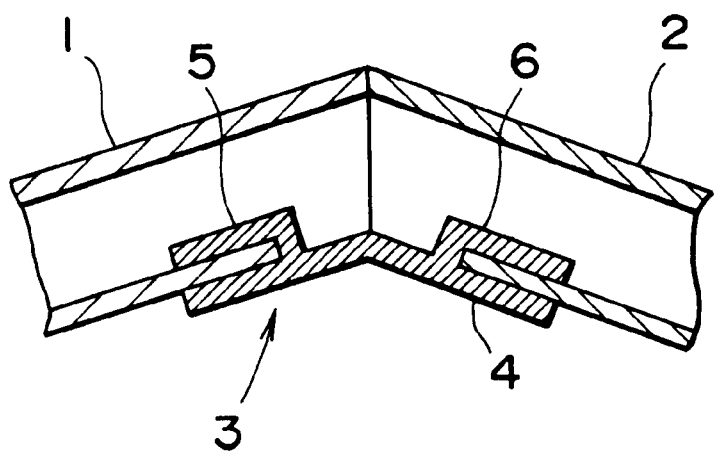

Embodiments of the present invention will now be described with reference to the drawings. FIGS. 1a and 1b are views showing a first embodiment of the present invention, wherein FIG. 1a is a perspective view and FIG. 1b is a sectional view. A first square tubular section 1 made of aluminum and a second square tubular section 2 made of aluminum are cut at their end portions obliquely with respect to longitudinal directions thereof. The thus-cut end portions are butted against each other to thereby arrange the sections 1 and 2 with a predetermined angle formed therebetween. This angle is a connection angle.

A joint member 3 of the present embodiment includes a band-plate-like angle retainment portion 4, which is bent to the above-mentioned connection angle, and first and second anchorage portions 5 and 6, respectively, which branch off from the angle retainment portion 4 and extend toward both ends of the angle retainment portion 4. The angle retainment portion 4 has a surface which is applied onto the outer surfaces of walls of the sections 1 and 2, the walls intersect each other with an angle equal to or smaller than 180° formed therebetween; in other words, the surface of the angle retainment portion 4 is applied onto the outer surfaces of interior-angle-side walls of the sections 1 and 2. The anchorage portions 5 and 6 extend in the shape of the letter L from the angle retainment portion 4 toward both ends of the angle retainment portion 4 and have surfaces parallel to the angle retainment portion 4. End portions of interior-angle-side walls of the sections 1 and 2 are inserted between the angle retainment portion 4 and the anchorage portions 5 and 6.

FIG. 1b shows how the joint member 3 having the above-described structure is used. Specifically, opposed end portions of walls of the sections 1 and 2 are inserted between the angle retainment portion 4 and the anchorage portions 5 and 6. Thus, the sections 1 and 2 are arranged such that the connection angle becomes a predetermined angle. Then, welding is performed along butt lines on the opposite side walls and exterior-angle-side walls of the sections 1 and 2. As for the interior-angle side of the sections 1 and 2, the angle retainment portion 4 of the joint member 3 is welded to the outer surfaces of the interior-angle-side walls of the sections 1 and 2 along four side edges of the angle retainment portion 4. Thus, the sections 1 and 2 are joined with a predetermined angle formed therebetween.

In the present embodiment, even when butt ends of the sections 1 and 2 are oblique to their longitudinal directions, through use of the joint member 3, the sections 1 and 2 can be easily positioned and can be highly accurately joined with a predetermined connection angle formed therebetween. Further, setting work can be performed very easily. Also, since the interior-angle-side walls of the sections 1 and 2 are supported by the joint member 3, the interior-angle formed between the sections 1 and 2 is prevented from decreasing during welding. Further, there is no need of fillet welding as is conventionally practiced with interior-angle-side walls of the sections 1 and 2. Instead, the interior-angle-side walls are joined through welding between the angle retainment portion 4 of the joint member 3 and the interior-angle-side walls along edges of the angle retainment portion 4, thereby preventing the occurrence of a locally weakened portion. Thus, strength of the joined portion can be improved.

Figure 3:
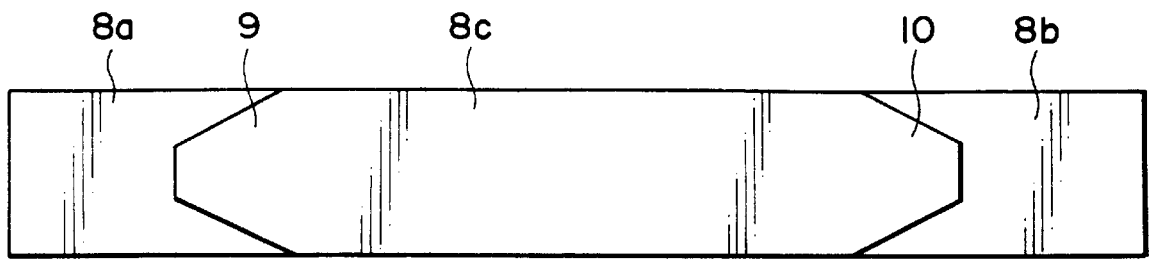
FIG. 3 is a plan view showing the second embodiment of FIG. 2.

Next, a second embodiment of the present invention will be described with reference to a sectional view of FIG. 2 and a plan view of FIG. 3. A joint member 7 of the present embodiment includes an angle retainment portion 8 having backing portions 8a and 8b, which are applied onto the inner surfaces of interior-angle-side walls of the sections 1 and 2, and first and second anchorage portions 9 and 10 extending from the backing portions 8a and 8b in the longitudinal directions of the joint member 7. The joint member 7 of the present embodiment further include an interior plate 8c extending between the backing portions 8a and 8b, an exterior plate 8d parallel to the interior plate 8c, a connection rib 8e fixed between the interior plate 8c and the exterior plate 8d at the central portions of the plates, connection ribs 8f and 8g fixed between the backing portion 8a and the exterior plate 8d, and connection ribs 8h and 8i fixed between the backing portion 8b and the exterior plate 8d.

In the present embodiment, end portions to be joined of the interior-angle-side walls of the sections 1 and 2 are inserted between the anchorage portions 9 and 10 and the backing portions 8a and 8b with the inner surfaces of the interior-angle-side walls in contact with the backing portions 8a and 8b. FIG. 3 shows a plan view illustrating a state that the sections 1 and 2 are joined through use of the joint member 3. In this way, the sections 1 and 2 are arranged with a predetermined connection angle formed therebetween. Subsequently, the joint member 3 is welded to the interior-angle-side walls of the sections 1 and 2 along edges of the anchorage portions 9 and 10, and the sections 1 and 2 are welded together along connection lines on their opposite side walls and exterior-angle-side walls.

In the present embodiment, the backing portions 8a and 8b of the angle retainment portion 8 are thoroughly in contact with the inner surfaces of interior-angle-side walls of the sections 1 and 2. The connection ribs 8f and 8g and the connection ribs 8h and 8i are perpendicularly fixed to the back surface of the backing portions 8a and 8b, respectively. Further, the connection ribs 8f, 8g, 8h, and 8i are fixed to the exterior plate 8d together with the connection rib 8e. This arrangement increases rigidity of the angle retainment portion 8 of the present embodiment. Accordingly, the sections 1 and 2 are prevented from deforming when subjected to welding heat.

Figure 4:
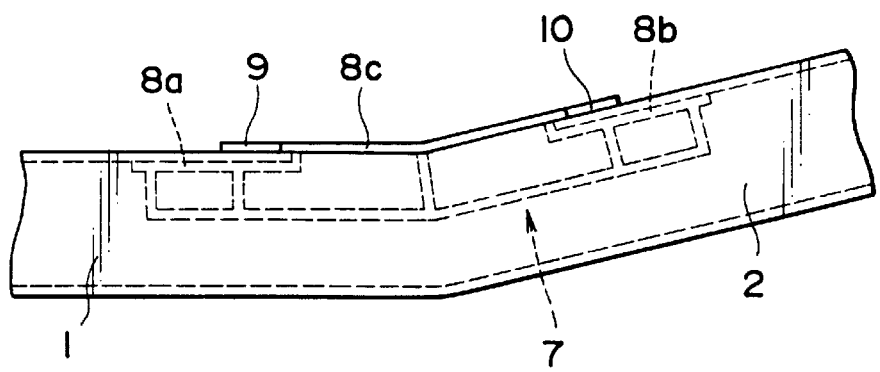
FIG. 4 is a front view showing a state in which sections are joined through use of a joint member according to the second embodiment.
Figure 5:
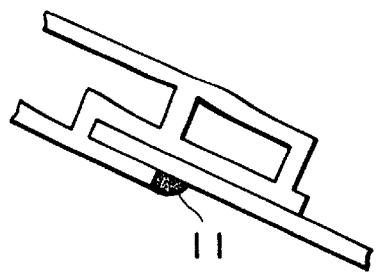
FIG. 5 is a view for explaining an effect of the second embodiment.
Figure 6:
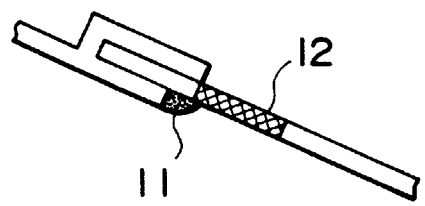
FIG. 6 is a view for explaining the effect of the second embodiment.

FIG. 6 shows a welded portion 11 in the case of the first embodiment of FIG. 1. In this case, the peripheral portion of the section's wall is likely to soften due to welding heat, resulting in the formation of a softened portion 12. However, as shown in FIGS. 2 to 4, in the present embodiment, the angle retainment portion 8 has a high-rigidity structure, in which the joint member 7 itself is reinforced and thus is less likely to deform. Further, as shown in FIG. 5, heat generated at the welded portion 11 during welding scatters through the connection ribs 8f to 8i to thereby minimize a thermal adverse effect on the sections 1 and 2, thus preventing a section's wall from softening. Needless to say, the present invention provides effects similar to those of the first embodiment shown in FIG. 1.

Figure 7:
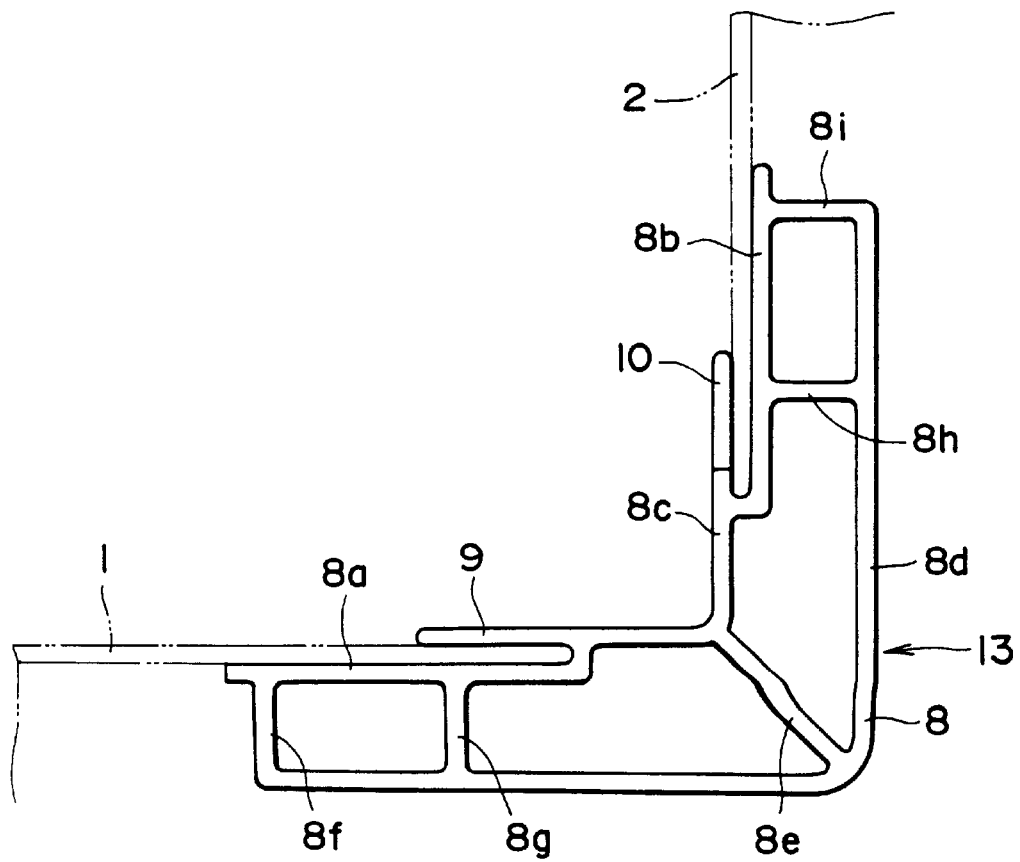
FIG. 7 is a sectional view showing a third embodiment of the present invention.
Figure 8:
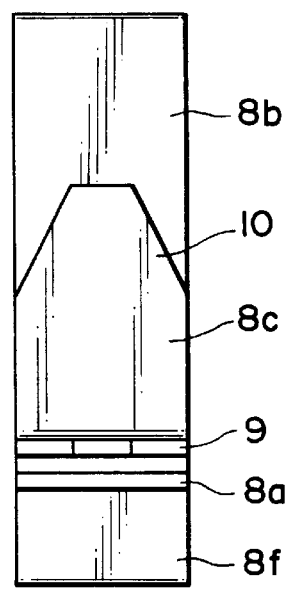
FIG. 8 is a side view showing the third embodiment.
Figure 9:
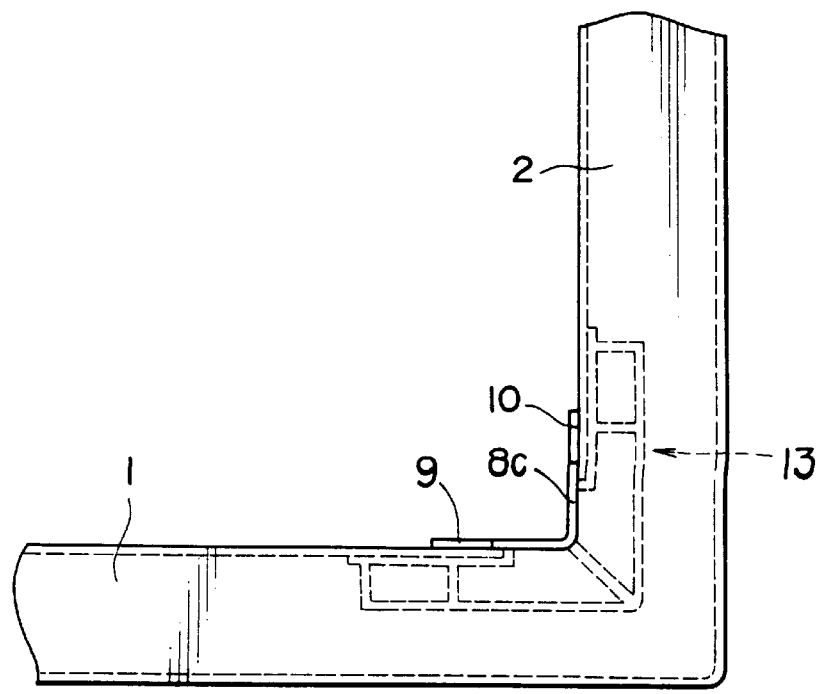
FIG. 9 is a front view showing a state in which sections are joined through use of a joint member according to the third embodiment.

Next, a third embodiment of the present invention will be described with reference to FIGS. 7 to 9. FIG. 7 shows a sectional view of the present embodiment, FIG. 8 shows a side view of the present embodiment, and FIG. 9 shows a state in which sections are joined through use of a joint member according to the present embodiment. In FIGS. 7 to 9, portions having functions identical to those of FIGS. 2 to 4 are denoted by common reference numerals, and detailed description thereof is omitted. In the present embodiment, the sections 1 and 2 are joined with a connection angle of 90° formed therebetween. In a joint member 11 of the present embodiment, an interior plate 8c and an exterior plate 8d are bent to 90°.

The thus-structured member 11 of the present embodiment facilitates the positioning of the sections 1 and 2 and avoids a thermal adverse effect on the sections 1 and 2 to thereby prevents deformation of the sections 1 and 2 during welding.

As shown in FIGS. 1, 2, and 5, the joint members of the above-described embodiments have a uniform sectional shape and thus can be manufactured by extrusion and cutting. Accordingly, an increase in cost of manufacture of a welded structure stemming from the use of the joint members is very small.

Figure 10:
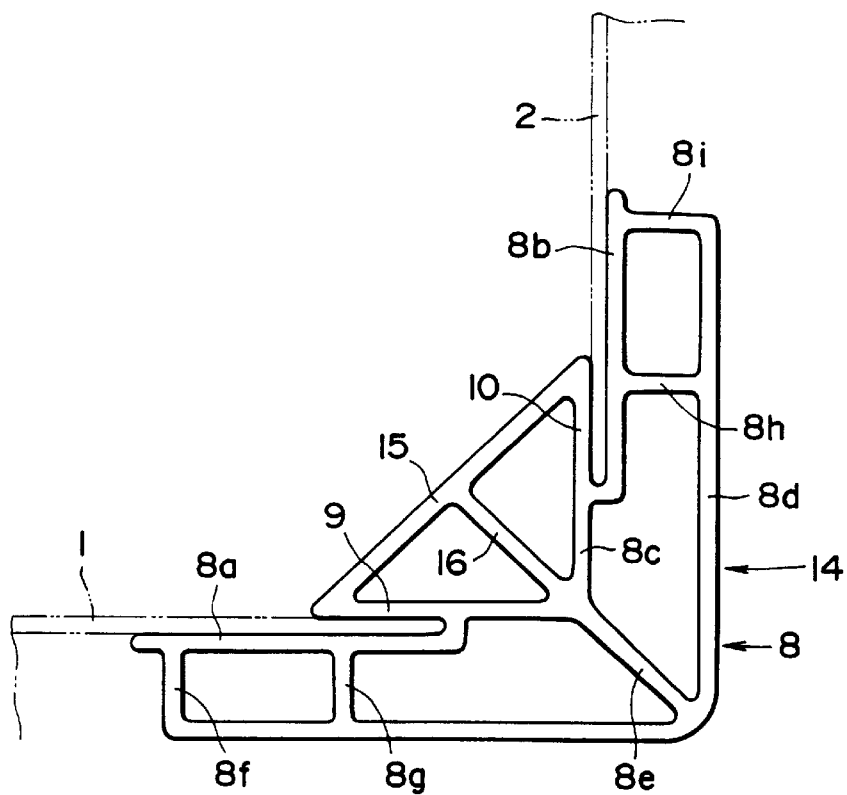
FIG. 10 is a sectional view showing a fourth embodiment of the present invention.
Figure 11:
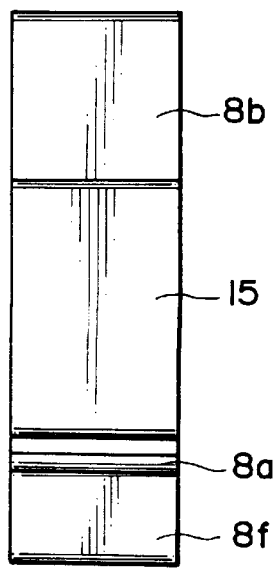
FIG. 11 is a side view showing the fourth embodiment of FIG. 10.
Figure 12:
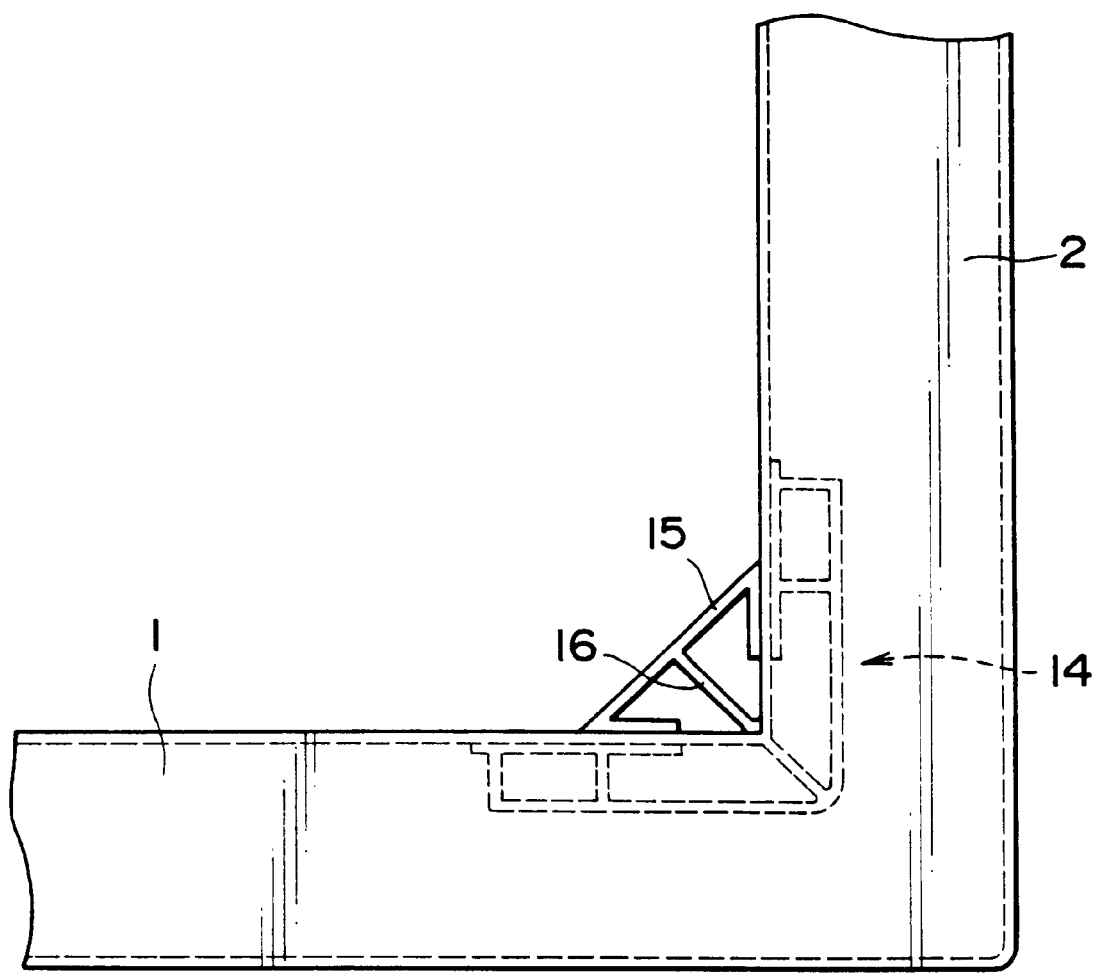
FIG. 12 is a front view showing a state in which sections are joined through use of a joint member according to the fourth embodiment.
Figure 13:
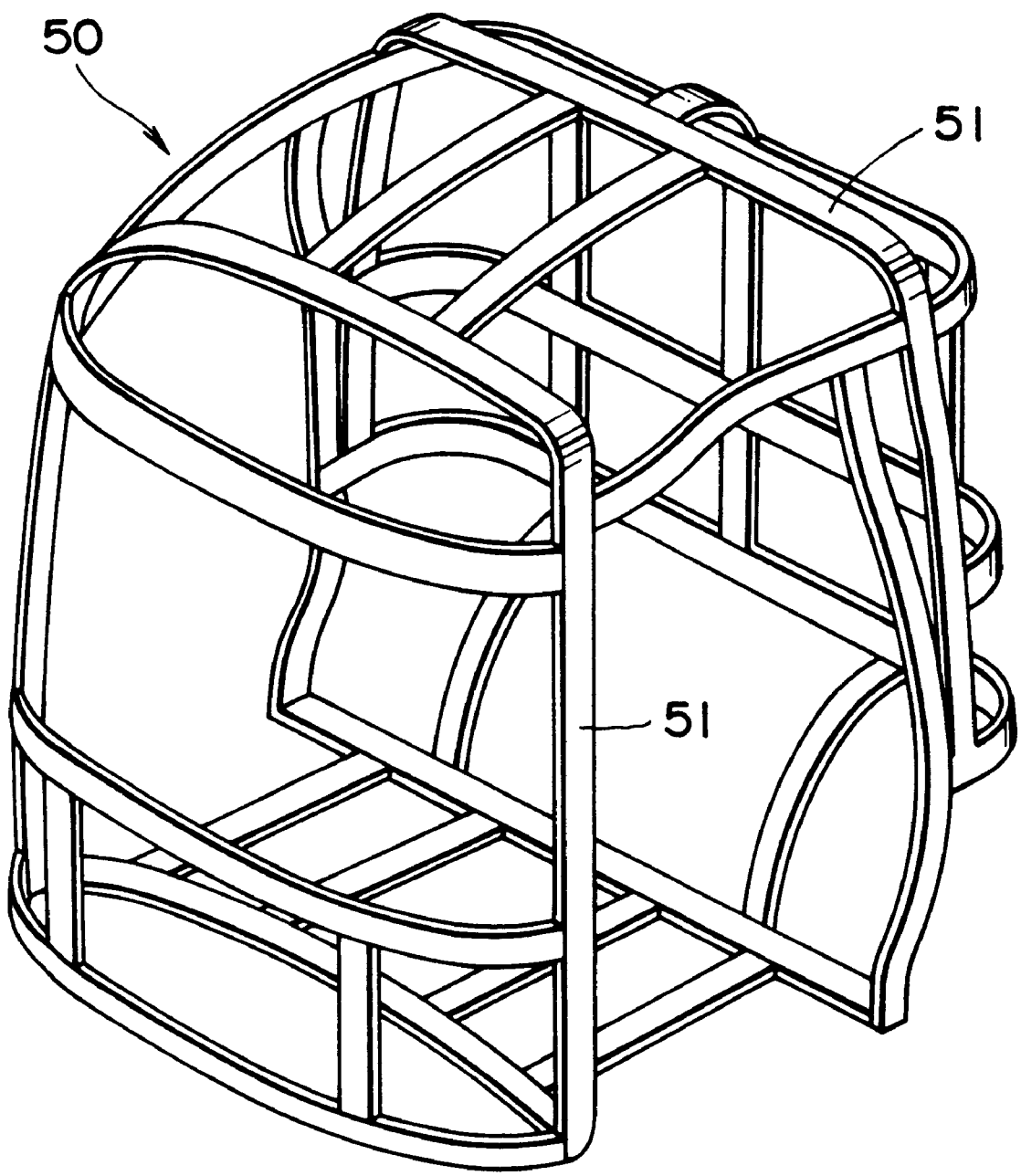
FIG. 13 is a view showing a space frame structure proposed for use with a truck.

Further, a fourth embodiment of the present invention will be described with reference to FIG. 10 and FIG. 11. FIG. 10 shows a sectional view illustrating a joint member according to the present embodiment. FIG. 11 shows a side view of the joint member of FIG. 10. FIG. 12 shows a state in which sections are joined through use of the joint member according to the present embodiment. The first square tubular section 1 made of aluminum and the second square tubular section 2 made of aluminum are cut at their end portions obliquely with respect to longitudinal directions thereof. The thus-cut end portions are butted against each other to thereby arrange the sections 1 and 2 with a predetermined angle (90° in the illustrated example) formed therebetween. This angle is a connection angle. A joint member 14 of the present embodiment is attached to interior-angle-side walls of the sections 1 and 2. The interior-angle-side walls are walls of the sections 1 and 2 which intersect each other with an angle equal to or smaller than 180° formed therebetween.

The joint member 14 has an angle retainment portion 8 which is bent to the aforementioned connection angle and which, in turn, has backing portions 8a and 8b. The angle retainment portion 8 further includes an interior plate 8c which extends between the backing portions 8a and 8b and is bent to 90° at a central section thereof, an exterior plate 8d which is parallel to the interior plate 8c and bent to 90°, a connection rib 8e fixed between the interior plate 8c and the exterior plate 8d at their central bent portions, connection ribs 8f and 8g fixed between the backing portions 8a and the exterior plate 8d, and connection ribs 8h and 8i fixed between the backing portions 8b and the exterior plate 8d.

The joint member 14 has first and second anchorage portions 9 and 10 which extend from the interior plate 8c of the angle retainment portion 8 toward ends of and in parallel with the backing portions 8a and 8b, respectively. In other words, the anchorage portions 9 and 10 extend from and in alignment with the interior plate 8c toward both ends of the angle retainment portion 8 and have surfaces parallel to the backing portions 8a and 8b, respectively. End portions of interior-angle-side walls of the sections 1 and 2 are inserted between the anchorage portions 9 and 10 and the backing portions 8a and 8b.

Further, the tip ends of the anchorage portions 9 and 10 are mutually joined through a connection rib 15. Accordingly, the connection rib 15 and each of the sections 1 and 2 form an angle of 45°. The central portion of the connection rib 15 and the central bent portion of the interior plate 8c are connected through a second connection rib 16. Thus, the second connection rib 16 is in alignment with the connection rib 8e.

FIG. 12 shows how the joint member 14 having the above-described structure is used. Specifically, opposed end portions of interior-angle-side walls of the sections 1 and 2 are inserted between the anchorage portions 9 and 10 and the backing portions 8a and 8b, respectively, such that the backing portions 8a and 8b are in contact with the inner surfaces of the interior-angle-side walls. Thus, the sections 1 and 2 are arranged such that the connection angle becomes a predetermined angle. Then, welding is performed along butt lines on the opposite side walls and exterior-angle-side walls of the sections 1 and 2. As for the interior-angle-side of the sections 1 and 2, the first and second anchorage portions 9 and 10 of the joint member 14 is welded to the outer surfaces of the interior-angle-side walls of the sections 1 and 2 along edges of the anchorage portions 9 and 10. Thus, the sections 1 and 2 are joined with a predetermined angle formed therebetween.

In the present embodiment, even when opposed ends of the sections 1 and 2 are oblique to their longitudinal directions, through use of the joint member 14, the sections 1 and 2 can be easily positioned and can be highly accurately joined at a predetermined connection angle. Further, setting work can be performed very easily. Also, since the interior-angle-side walls of the sections 1 and 2 are supported by the joint member 14, the interior angle formed between the sections 1 and 2 is prevented from decreasing during welding. Further, there is no need of fillet welding as is conventionally practiced with interior-angle-side walls of the sections 1 and 2. Instead, the interior-angle-side walls are joined through welding between the angle retainment portion 8 of the joint member 14 and the interior-angle-side wails along edges of the angle retainment portion 8, thereby preventing the occurrence of a locally weakened portion. Thus, strength of the joined portion can be improved.

In the present embodiment, the backing portions 8a and 8b of the angle retainment portion 8 are thoroughly in contact with the inner surfaces of interior-angle-side walls of the sections 1 and 2. The connection ribs 8f and 8g and the connection ribs 8h and 8i are perpendicularly fixed to the back surfaces of the backing portions 8a and 8b, respectively. Further, the connection ribs 8f, 8g, 8h, and 8i are fixed to the exterior plate 8d together with the connection rib 8e. This arrangement increases rigidity of the angle retainment portion 8 of the present embodiment. Also, the angle retainment portion 8 functions as a backing material at the time of welding the anchorage portions 9 and 10 and the sections 1 and 2 together. Thus, the angle retainment portion 8 having high rigidity functions as a backing material, so that the sections 1 and 2 are prevented from deforming when subjected to welding heat.

Further, in the present embodiment, the end portions of the first and second anchorage portions 9 and 10 are connected through the connection rib 15, and the connection rib 15 and the interior plate 8c are connected through the connection rib 16. Further, since both edge portions of the connection rib 15 are welded to the sections 1 and 2, the connection ribs 15 and 16 function as reinforcement members for the joined portion of the sections 1 and 2.

Accordingly, the joint member 14 of the present embodiment not only facilitates the setting of the sections 1 and 2 but also serves as a reinforcement member for the joined portion of the sections 1 and 2. This feature, together with high rigidity of the angle retainment portion 8, significantly increases the joining strength between the sections 1 and 2.

Also, as shown in FIG. 10, the joint member 14 of the present embodiment has a uniform sectional shape and thus can be manufactured by extrusion and cutting. Accordingly, an increase in cost of manufacture of a welded structure stemming from the use of the joint member 14 is very small.

In the present embodiment, the joint member 14 is used such that the angle retainment portion 8 is applied onto the inner surfaces of interior-angle-side walls of the sections 1 and 2, while the first and second anchorage portions 9 and 10 are brought in contact with the outer surfaces of the interior-angle-side walls. Accordingly, the anchorage portions 9 and 10 are exposed to the exterior of the sections 1 and 2, while the angle retainment portion 8 resides within the sections 1 and 2.

However, the arrangement of the joint member 14 is not limited to that of the present embodiment. The backing portions 8a and 8b of the angle retainment portion 8 may be applied onto the outer surfaces of interior-angle-side walls of the sections 1 and 2, while the first and second anchorage portions 9 and 10 may be brought in contact with the inner surfaces of the interior-angle-side walls. In this case, the connection rib 15 serving as reinforcement members is fixed between end portions of the exposed angle retainment portion 8, not between end portions of the anchorage portions 9 and 10. As a result, when the end portions of the angle retainment portion 8 are welded to the outer surfaces of the interior-angle-side walls, there is established a state that the connection rib 15 is directly welded to the outer surfaces of the interior-angle-side walls, so that the connection rib 15 functions sufficiently as a reinforcement member. In either case, the connection rib 15 serving as a reinforcement member is disposed on the interior-angle side of the sections 1 and 2.

The shape and dimensions of a reinforcement member (the connection ribs 15 and 16) can be determined in accordance with a required magnitude of reinforcement.

As has been described above, according to the present invention, sections can be joined together with a predetermined connection angle formed therebetween, and setting work for such joining can be easily performed. In the present invention, a joint member is welded to interior-angle-side walls of sections, thereby avoiding fillet welding which is conventionally performed for joining the interior-angle-side walls and thus preventing a connection angle between sections from changing during welding. Through avoidance of this fillet welding, the occurrence of a locally weakened portion in a structure can be avoided; in other words, strength of a joined portion can be improved.

Also, in the present invention, a connection rib portion serving as a reinforcement member is provided on the interior-angle side of sections, thereby reinforcing a joined portion of the sections. Thus, the present invention increases strength of a joined portion of sections and allows magnitude of reinforcement to be freely designed through adjustment of shape such as length of a connection rib portion, thereby improving degrees of freedom for frame design.

Further, an angle retainment portion has a structure of high rigidity attained through employment of a connection rib or the like, thereby reinforcing a joint member and thus preventing sections from softening at a portion near a weld due to welding heat.

The entire disclosure of Japanese Patent Applications Nos. Hei 8-236980 and Hei 8-236988 filed on Sep. 6, 1996 including specification, claims, drawings and summary is incorporated herein by reference in its entirety.

We claim:

1. A joint member in a welded structure including a first tubular section made of aluminum or aluminum alloy and a second tubular section made of aluminum or aluminum alloy with the sections' end portions butting against each other so as to weld the butt end portions together in a process of manufacturing the welded structure, said joint member comprising:

an angle retainment portion which is applied onto the outer or inner surfaces of walls of the first and second tubular sections, which walls intersect each other with an angle equal to or smaller than 180°; and first and second anchorage portions which branch off and extend from the angle retainment portion and fixedly hold the walls of the first and second tubular sections, respectively, in cooperation with said angle retainment portion.

2. A joint member in a welded structure according to claim 1, further comprising:

a plurality of connection ribs fixed to a back surface of said angle retainment portion; and an exterior plate that connects said connection ribs together.

3. A joint member in a welded structure including a first tubular section made of aluminum or aluminum alloy and a second tubular section made of aluminum or aluminum alloy with the sections' end portions butting against each other so as to weld the butt end portions together in a process of manufacturing the welded structure, said joint member comprising:

an angle retainment portion which is applied onto the inner surfaces of walls of the first and second tubular sections, which walls intersect each other with an angle equal to or smaller than 180°;

first and second anchorage portions which branch off and extend from the angle retainment portion and fixedly hold the walls of the first and second tubular sections, respectively, in cooperation with said angle retainment portion; and a connection rib which connects end portions of said first and second anchorage portions.

4. A joint member in a welded structure according to claim 3, further comprising a second connection rib that connects said connection rib and said angle retainment portion.

5. A joint member in a welded structure including a first tubular section made of aluminum or aluminum alloy and a second tubular section made of aluminum or aluminum alloy with the sections' end portions butting against each other so as to weld the butt end portions together in a process of manufacturing the welded structure, said joint member comprising:

an angle retainment portion which is applied onto the outer surfaces of walls of the first and second tubular sections, which walls intersect each other with an angle equal to or smaller than 180°;

first and second anchorage portions which branch off and extend from the angle retainment portion and fixedly hold the walls of the first and second tubular sections, respectively, in cooperation with said angle retainment portion; and a connection rib that connects end portions of said angle retainment portion.

6. A joint member in a welded structure according to claim 5, further comprising a second connection rib that connects said connection rib and said angle retainment portion.

* * * * *